United States Patent
Liao

(10) Patent No.: US 9,906,114 B2
(45) Date of Patent: *Feb. 27, 2018

(54) VOICE COIL MOTOR

(71) Applicant: HON HAI PRECISION INDUSTRY CO., LTD., New Taipei (TW)

(72) Inventor: Chia-Hung Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 301 days.

This patent is subject to a terminal disclaimer.

(21) Appl. No.: 14/832,766

(22) Filed: Aug. 21, 2015

(65) Prior Publication Data

US 2015/0364980 A1 Dec. 17, 2015

(30) Foreign Application Priority Data

Apr. 14, 2014 (TW) .............................. 103113511 A

(51) Int. Cl.
*H02K 41/03* (2006.01)
*H02K 41/035* (2006.01)
*G03B 13/34* (2006.01)

(52) U.S. Cl.
CPC ......... *H02K 41/0356* (2013.01); *G03B 13/34* (2013.01); *G03B 2205/0069* (2013.01)

(58) Field of Classification Search
CPC ............................ H02K 41/0356; G03B 13/34
USPC ..................................................... 310/12.16
See application file for complete search history.

(56) References Cited

U.S. PATENT DOCUMENTS

| | | | |
|---|---|---|---|
| 8,810,936 B2* | 8/2014 | Min | H02K 41/0356 310/12.16 |
| 9,625,736 B2* | 4/2017 | Liao | G02B 27/646 |
| 2012/0008220 A1* | 1/2012 | Lee | G03B 3/10 359/822 |
| 2013/0162058 A1* | 6/2013 | Liao | H02K 41/0356 310/12.16 |
| 2013/0249323 A1* | 9/2013 | Backes | H01F 7/1646 310/12.16 |
| 2013/0264892 A1* | 10/2013 | Jung | G02B 7/08 310/12.16 |

FOREIGN PATENT DOCUMENTS

TW 201344325 11/2013

* cited by examiner

*Primary Examiner* — Forrest M Phillips
(74) *Attorney, Agent, or Firm* — ScienBiziP, P.C.

(57) ABSTRACT

A voice coil motor includes a base, a first resilient member, a movable member, a wire coil, a second resilient member, a housing, and a group of magnets. The base includes a through hole, a circular groove surrounding the through hole and guide poles extending away from the base. The first resilient member includes a number of guide holes arranged at a peripheral. The movable member includes a receiving through hole for receiving a lens module, a top end and a bottom end, the moveable frame is fixed with the first resilient member and suspended above the circular groove. The wire coil surrounds the movable member. The second resilient member locates on the top end of the moveable frame. The housing receives the base. Each magnets is fixed to the second resilient member, the magnets and the wire coil cooperatively generate a magnetic force for driving the movable member.

11 Claims, 6 Drawing Sheets

VOICE COIL MOTOR

FIELD

The subject matter herein generally relates to lens actuators, and particularly, to a voice coil motor.

BACKGROUND

A voice coil motor is configured to drive lenses along an optical axis in image capturing devices thereby achieving an auto-focus function of the image capturing device. A typical voice coil motor includes a moveable frame for accommodating a lens barrel with lenses therein, a wire coil wrapped around the moveable frame, a number of magnets, a stationary frame for fixing the magnets and accommodating the moveable frame.

When a current is applied to the coil, a magnetic force is produced between the magnets and the wire coil, and the moveable frame with the lens barrel moves upward relative to the stationary frame. When the current is cut off, the moveable frame with the lens barrel is reset to its original position. However, during the movement of the moveable frame, the magnetic force must overcome pre-stress first. This causes a large current and wastes electricity.

Therefore, it is desirable to provide a voice coil motor, which can overcome or at least alleviate the above-mentioned problems.

BRIEF DESCRIPTION OF THE DRAWINGS

Implementations of the present technology will now be described, by way of example only, with reference to the attached figures.

DETAILED DESCRIPTION

Figure 1:
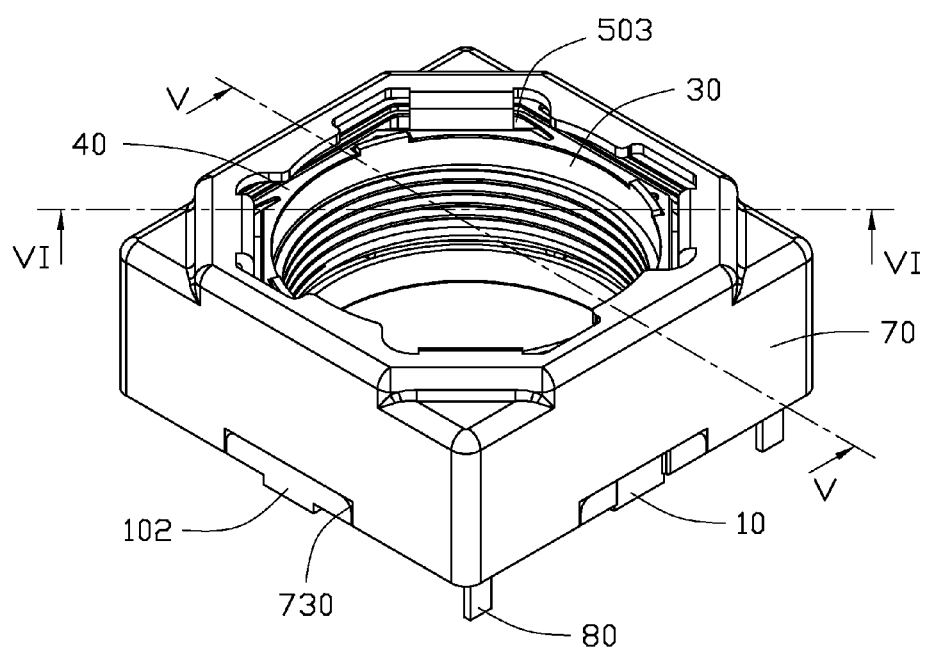
FIG. 1 is an isometric view of a voice coil motor with a housing in accordance with one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like. The phrases "a plurality of" and "a number of" mean "at least two."

FIG. 1 shows a voice coil motor 100. The voice coil motor 100 includes a base 10, a first resilient plate 20, a moveable frame 30, a second resilient plate 40, a wire coil 50, a group of magnets 60, a housing 70 and at least one conductive terminal 80.

The base 10 is substantially cuboid and defines a through hole 101 at center thereof. The base 10 includes a first surface 11, a second surface 12 opposite to the first surface 11 and four corners 13. Each corner 13 includes a protrusion 130 extending away from the first surface 11, each protrusion 130 is arranged with a guide pole 132 extending away from the protrusion 130.

The base 10 also includes a circular groove 14 surrounding the through hole 101, two insert holes 134 arranged at two adjacent edges of the corners 13 and four convex portions 102 arranged between each two corners 130. The circular groove 14 is defined on the first surface 11 and located inside of the four corners 13. The insert hole 134 is configured for receiving the conductive terminal 80.

Figure 3:
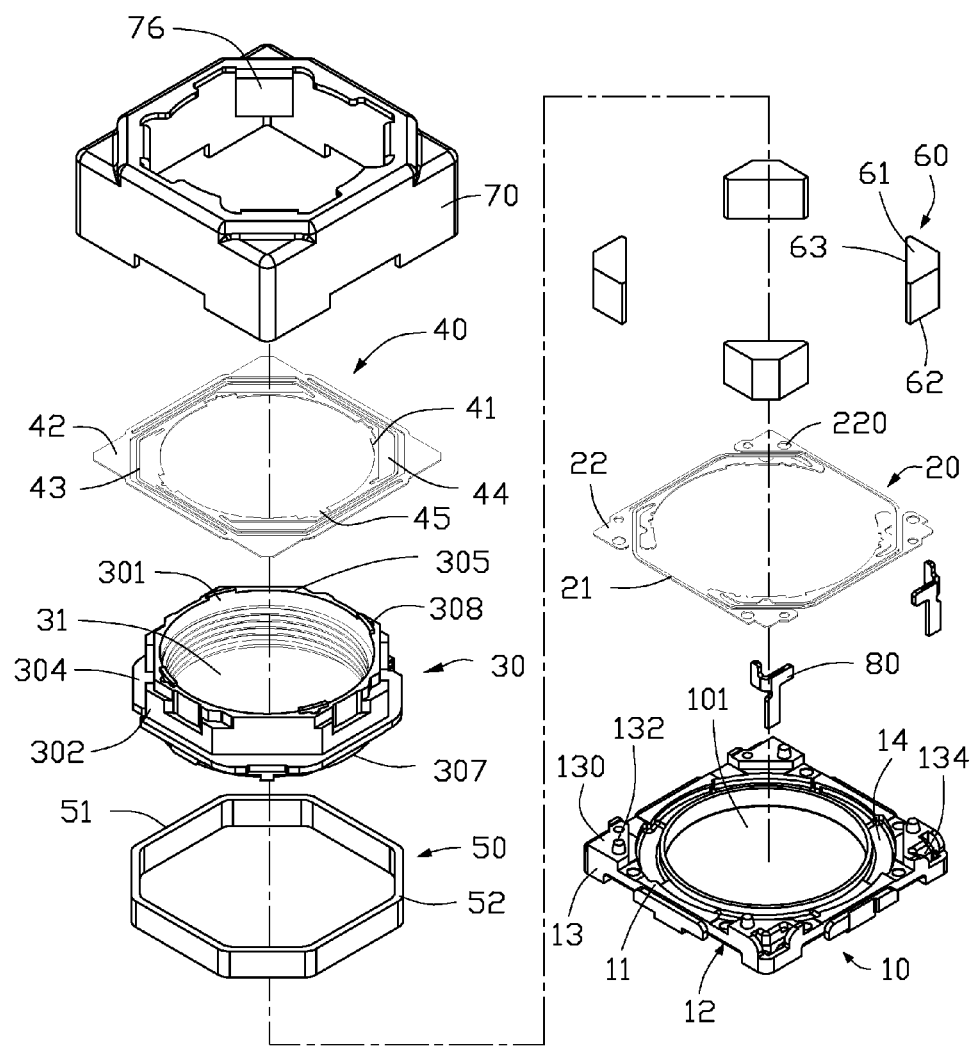
FIG. 3 is an exploded view of the voice coil motor of FIG. 1.
Figure 4:
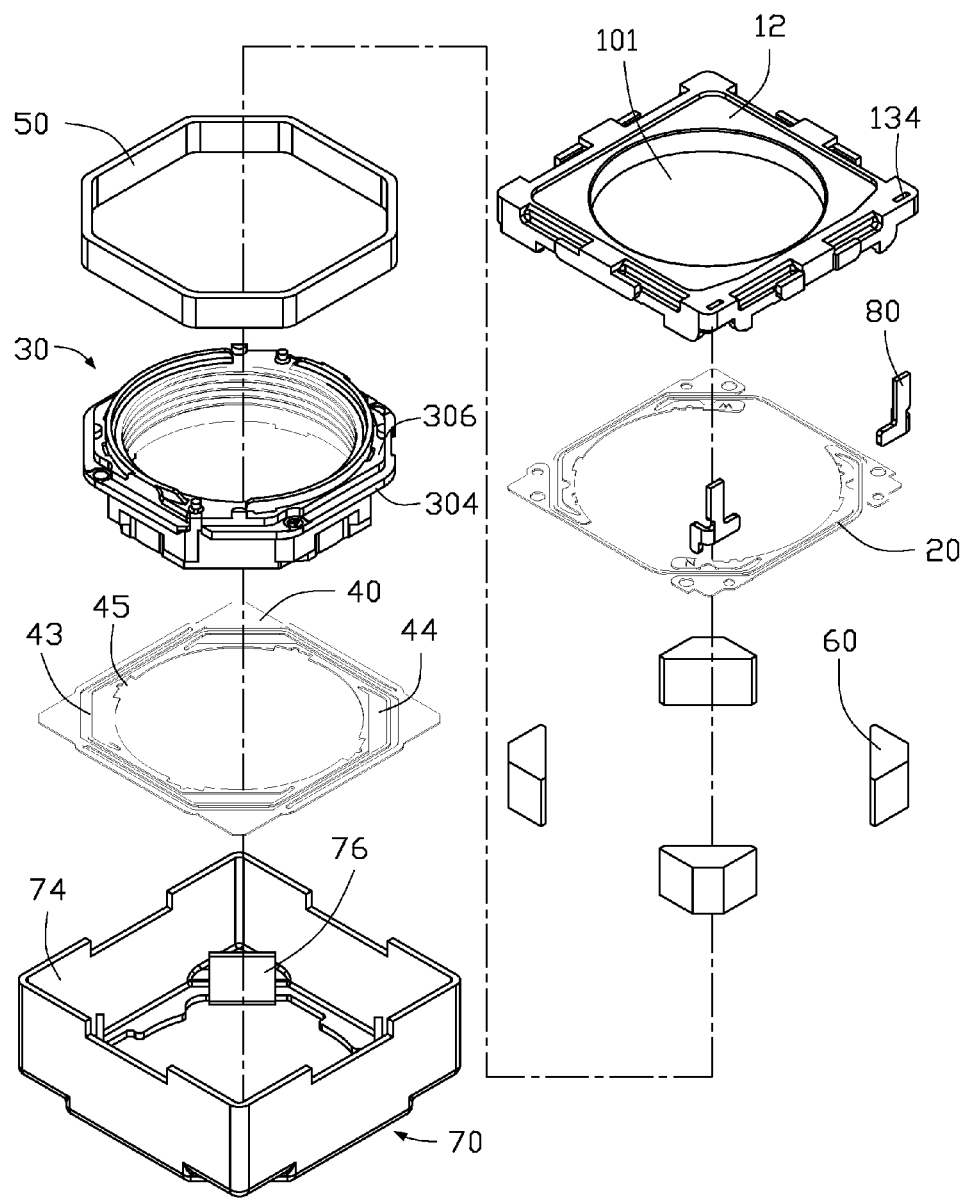
FIG. 4 is similar to FIG. 3, but shows the voice coil motor from a different viewpoint.

The first resilient plate 20 includes a first flexible arm 21 and a second flexible arm 22 connecting to the first flexible arm 21, as shown in FIG. 3 and FIG. 4. The first flexible arm 21 defines a plurality of guide holes 220 corresponding to the guide poles 132. The first resilient plate 20 is fixed to the base 10 by glue, the second flexible arm 22 is able to move relative to the first flexible arm 21 along an optical axis direction of the moveable frame 30.

The moveable frame 30 is placed on the first resilient plate 20 and includes a receiving through hole 31 configured to receive a lens module (not shown). The moveable frame 30 includes an inner side wall 301, an outside wall 302, a top end 305, a bottom end 307 opposite to the top end 305, a first flange 304 surrounding the outer wall 302 and a second flange 306 parallel with the first flange 304, as shown in FIG. 4. The receiving through hole 31 has inner threads formed in the inner wall. The moveable frame 30 has a plurality of protrusions 308 formed at an edge of the top end 305. The top end 305 is adjacent to an object side of the lens module and the bottom end 307 is adjacent to an image side of the lens module, the receiving through hole 31 runs through the top end 305 and the bottom end 307. The first flange 304 is configured to receive the wire coil 50, the second flange 306 contacts with the first resilient member 304, and the bottom end 307 is located above the circular groove 14.

The second resilient member 40 includes an inner flexible arm 41, an outer flexible arm 42, and a plurality of connection arms 43 connecting the inner flexible arm 41 and the outer flexible arm 42. Each connection arm 43 and the inner flexible arm 41 from an opening 44 therethrough. Each opening 44 is substantially trapezoid shaped. A plurality of first cutouts 45 are formed in an inner wall of the inner flexible arm 41. The second resilient member 40 is placed at the top end of the moveable frame 30 whereby the protrusions 308 of the moveable frame 30 engage in the first cutouts 45 of the second resilient member 40.

The wire coil 50 is fixed on the first flange 304. The wire coil 50 is substantially octagon and includes four side surfaces 51 and four connecting surfaces 52 connecting two of the four side surfaces 51, each connecting surface 52 and the outer side surface of the moveable frame 30 together define a receiving space 503. The insert plates 76 are received in the receiving space 503 when the moveable frame 30 and the wire coil 50 are received in the housing 70.

The magnetic member 60 is substantially trapezoid shaped, and includes a first end surface 61, a second end surface 62 opposite to the first end surface 61 and a first side surface 63, the first end surface 61 is fixed with the outer flexible arm 42, and the first side surface 63 faces the connecting surface 52. A magnetic force between the magnets 60 and the wire coil 50 provides a driving force for driving the moveable frame 30 to move along an optical axis direction of the lens module when a current is applied to the wire coil 50.

The housing 70 is fixed to base 10. The housing 70 is made of electromagnetic shielding material, such as nickel alloy, conductive plastic, surface conductive material, conductive glass, or other suitable shielding material. The housing 70 is configured for blocking contaminants such as dust and preventing electro magnetic disturbances. The housing 70 is a substantially hollow cuboid and includes a first top plate 71, a second top plate 72 protruding away from the first top plate 71, and four sidewalls 73 perpendicularly connecting with the first top plate 71. The second top plate 72 defines an aperture 75 in the center thereof, the aperture 75 can be substantially shaped as an octagon in a cross-section. The sidewalls 73 are connected to each other to form four interior corners 74. Each sidewall 73 defines a second cutout 730 at the end away from the first top plate 71. The second cutout 730 matches with the convex portion 102 of the housing 10.

The housing 70 includes four insert sheets 76 extending inwardly from the rim of the aperture 75. Each insert sheet 76 is arranged facing each interior corner 74 and a length of each insert sheet 76 along the central axis direction is less than a height of the housing 70. When the voice coil motor 100 is assembled, the insert sheet 76 is located in the receiving space 503. The insert sheet 76 has two functions, first, it can reduce a magnetic resistance between the housing and the magnet, which helps a movement of the moveable frame along an optical axis; second, the insert sheet 76 is configured to guide a movement of the moveable frame 30 along the optical axis, avoiding a large angle deflection of the moveable frame 30.

Figure 2:
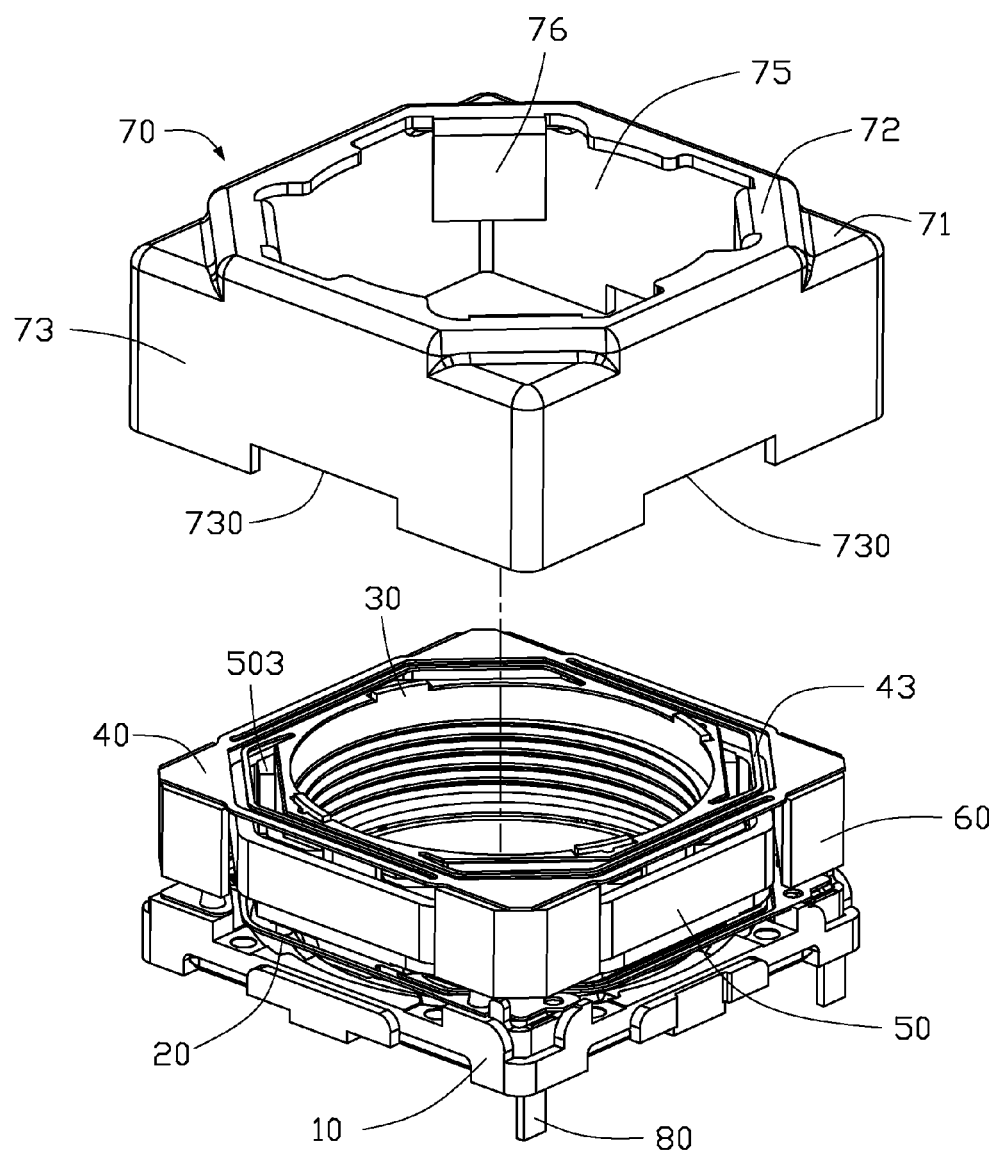
FIG. 2 is a patially exploded, isometric view of a voice coil motor of FIG. 1.
Figure 5:
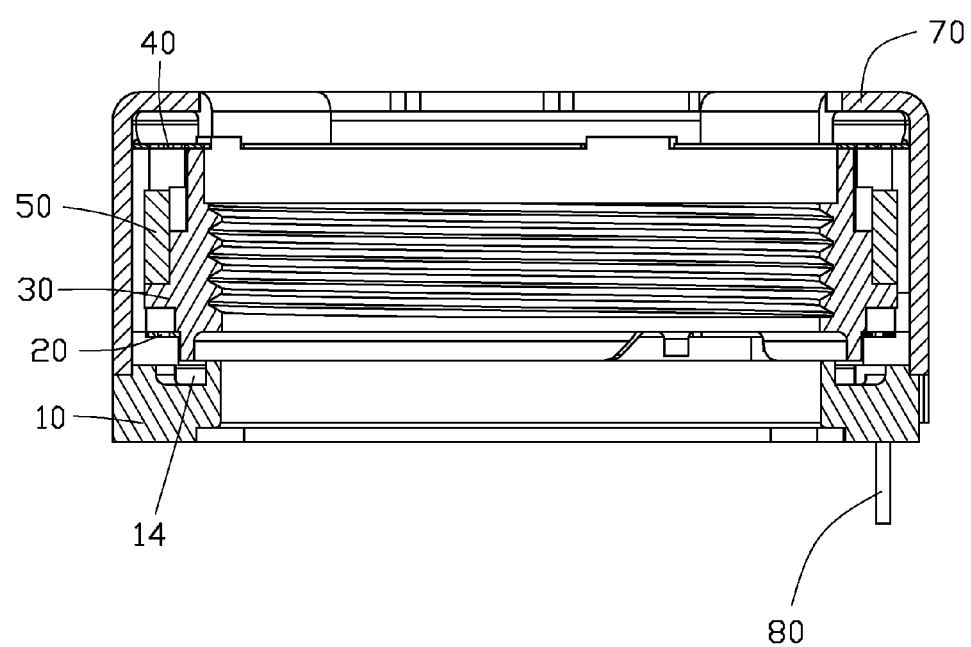
FIG. 5 is a cross-sectional view of the voice coil motor of FIG. 1 taken along line V-V.
Figure 6:
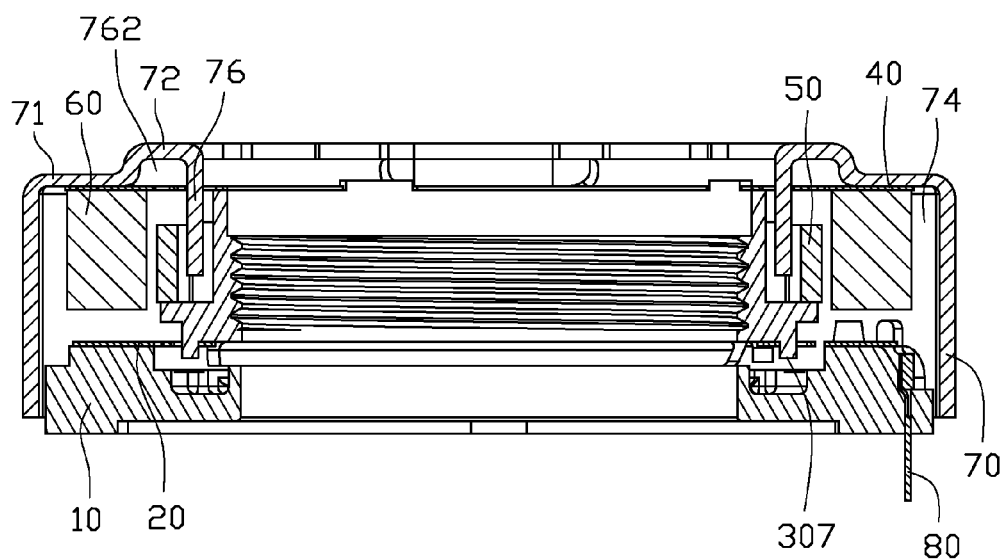
FIG. 6 is a cross-sectional view of the voice coil motor of FIG. 1 taken along line VI-VI.

As shown in FIG. 2 and FIGS. 5-6, the conductive terminal 80 is inserted into the insert hole 134 and electrically connected with an image sensor (not shown). The first resilient member 20 is mounted on the base 10 via the guide poles 132 passing through the guide holes 220. The first flexible arm 21 of the first resilient member 20 is fixed with the base 10 using glue. The second flexible arm 22 is fixed to the second flange 306 of the moveable frame 30. The wire coil 50 is disposed on the first flange 304 and surrounds the moveable frame 30. Each connecting surface 52 and the outer side surface of the moveable frame 30 cooperatively form a receiving space 503. The inner flexible arm 41 of the second resilient member 40 is fixed to the top end 305 of the moveable frame 30 and the opening 44 is located above the receiving space 503. The magnetic member 60 (as shown in FIG. 6) is fixed to the corner portion of the outer flexible arm 43 of the second resilient member 40. The wire coil 50 is surrounded by the four magnets 60. The housing 70 is covered outside of the magnets 60. The first top plate 71 contacts with the second resilient member 40. Each magnets 60 is located in the interior corners 74. Each insert sheet 76 is inserted into the receiving space 503. The second resilient member 40 and the second top plate 72 form a space 762 therebetween. The space 762 allows the moveable frame 30 to move upwards and downwards, and glue can be applied to the convex portion 102 to fix the housing 70 to the base 10. The voice coil motor 100 is obtained, and the moveable frame 30 is suspended above the circular groove 14. A bottom end 307 of the moveable frame 30 is spaced apart with the circular groove 14 of the base 10 in a natural state. In other words, the first and the second resilient member 20 and 40 provide a supporting force for the moveable frame 30, thereby, the moveable frame 30 is sandwiched between the first and the second resilient member 20 and 40, and not contact with the base 10. Thus, the base 10 is not needed to provide a pre-stress for the moveable frame 30 when the moveable frame 30 moves upwards and downwards.

In operation, a current is applied to the wire coil 50, and the movable member 30 is able to move upwards and downwards in the housing 10 due to an interaction between the wire coil 50 and the group of magnets 60. Additionally, the base 10 has no pre-structure for supporting the moveable frame 30 during a movement of the moveable frame 30 upwards and downwards. The voice coil motor 100 has no need to overcome pre-stress along the direction of optical axis, thereby saving electrical energy.

The embodiments shown and described above are only examples. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A voice coil motor comprising:
   a base defining a through hole at center thereof and comprising a circular groove surrounding the through hole;
   a first resilient member being mounted on the base;
   a movable member forming a receiving through hole configured to receiving a lens module, the movable member comprising a top end and a bottom end opposite to the top end and being fixed with the first resilient member and suspended above the circular groove;
   a wire coil fixed to the movable member and surrounding the movable member;
   a second resilient member being fixed on the top end of the moveable frame;
   a housing configured to receive the base, the movable member, the wire coil, the first and the second resilient member; and
   a plurality of magnets, each magnetic member being fixed to the second resilient member and surrounding the wire coil, the plurality of magnets and the wire coil cooperatively configured for generating a magnetic driving force for driving the movable member to move in the housing.

2. The voice coil motor of claim 1, wherein the base comprises a plurality guide poles extending away from the base and being located outside of the circular groove, the first resilient member defines a plurality of guide holes at a peripheral portion thereof, the plurality of guide holes are corresponded to the plurality of guide poles.

3. The voice coil motor of claim 2, wherein the base comprises a first surface, a second surface opposite to the first surface and four corners, each corner comprises a protrusion extending away from the first surface, each protrusion is arranged with a guide pole extending away from the protrusion.

4. The voice coil motor of claim 3, wherein the first resilient plate comprises a first flexible arm and a second flexible arm connecting with the first flexible arm, the plurality of guide holes is defined on the first flexible arm.

5. The voice coil motor of claim 4, wherein the second resilient member comprises an inner flexible arm, an outer flexible arm, and a plurality of connection arms connecting the inner flexible arm and the outer flexible arm, an opening is formed between each the connection arm and the inner flexible arm, and each the opening is substantially trapezoid shaped.

6. The voice coil motor of claim 5, wherein the magnetic member is substantially trapezoid shape and comprises a first end surface, a second end surface opposite to the first end surface and a first side surface, the first end surface is fixed with the outer flexible arm of the second resilient member, and the first side surface faces the connecting surface of the wire coil.

7. The voice coil motor of claim 6, wherein the moveable frame comprises a plurality of protrusions formed at an edge of the top end, inner wall of the inner flexible arm comprises a plurality of first cutouts, the cutouts engage with the protrusions.

8. The voice coil motor of claim 1, wherein the housing is a substantially hollow cubiod and comprises a first top plate, a second top plate protruding away from the first top plate, and four sidewalls perpendicularly connecting with the first top plate, the second top plate defines an aperture in the center thereof, the sidewalls are connected to each other to form four interior corners, each sidewall defines a cutout at the end away from the first top plate.

9. The voice coil motor of claim 8, wherein the base further comprises two insert holes arranging at edge of the corners and four convex portions each arranging between each two corners, the insert hole is configured to receive a conductive terminal, the convex portion engages with the cutout.

10. The voice coil motor of claim 9, wherein the moveable frame comprises an inner side wall, an outside wall, a top end, a bottom end opposite to the top end, a first flange surrounding the outer side wall and a second flange parallel with the first flange, the top end adjacent to an object side of the lens module and the bottom end adjacent to an image side of the lens module.

11. The voice coil motor of claim 10, wherein the wire coil is fixed on the first flange, the wire coil is substantially octagon and includes four side surface and four connecting surface connecting each two side surface, each connecting surface and the outer side surface of the moveable frame together form a receiving space.

\* \* \* \* \*